United States Patent Office 3,707,534
Patented Dec. 26, 1972

3,707,534
METHOD FOR PRODUCTION OF LACTULOSE CONCENTRATE
Ernst Nitsch and Siegfried Muhlbock, Linz, Austria, assignors to Laevosan-Gesellschaft Chem. Pharm. Industrie Franck & Dr. Freudl, Linz (Danube), Austria
No Drawing. Filed Feb. 9, 1970, Ser. No. 9,978
Claims priority, application Austria, Feb. 7, 1969,
A 1,256/69
Int. Cl. C07c 47/18
U.S. Cl. 260—209 R
7 Claims

ABSTRACT OF THE DISCLOSURE

A method of preparing a lactulose concentrate by epimerization of a hot aqueous lactose solution which comprises admixing a hot aqueous concentrated solution of lactose with between about 0.05 and 0.5 mol of at least one sulfite selected from the group consisting of alkali sulfites and alkaline earth sulfites per kg. of lactose monohydrate content of said lactose solution, and maintaining the admixture of said sulfite and said lactose solution at a temperature between about 80° C. and 110° C. to convert lactose in said lactose solution into lactulose.

---

The present invention relates to a method of producing lactulose concentrate.

Since the work of Petuely ("Biochemische Untersuchungen zur Regulation der Dickdarmflora des Säuglings über den Bifidusfaktor," published by Verlag Notring der wissenschaftlichen Verbände Osterreichs, 1957), lactulose has become of interest as means for producing a bifid flora in therapy and in infant feeding. Since up to now it has been possible to obtain it is crystalline form only at relatively high expense, there was generally used a concentrate which, in addition to lactulose, contained primarily also lactose and galactose (U.S. Pat. No, 3,272,705). All previously known methods of producing lactulose or lactulose concentrates start from an alkali-catalyzed transposition of the aldoses—in this case lactose—into their epimeric ketoses (Lobry de Bruyn-Alberda van Ekenstein transposition). Montgomery and Hudson (J. Am. Chem. Soc. 52, 2101, 1930, "Relations Between Rotatory Power and Structure in the Sugar Group") epimerized an aqueous, approximately 20% solution of lactose saturated at 35° C. with calcium hydroxide, the formation of lactulose reaching a maximum in four days. The same authors for the first time prepared pure crystallized lactulose. In accordance with U.S. Pat. No. 3,272,705 and Austrian Pat. No. 206,586, the reaction is carried out hot while stirring a suspension of calcium hydroxide therein. Gatzsche and Haenel (Ernährungsforschung 12, 4 (1967), 641–647, "The Production of Lactulose") [Uber die Herstellung von Lactulose] described the epimerization of lactose at 37° C. by treatment with potassium hydroxide solution. The disadvantage of all these known methods resides in particular in the ample formation of colored substances and organic acids which are difficult to remove. Aside from an increased cost for purification, this also means a not inconsiderable loss of sugar.

Cold epimerization requires reaction times of days and, in view of the low solubility of the lactose, large quantities of solvent, which must then be removed by evaporation at high expense.

It has now surprisingly been found, that very gentle epimerization, while still obtaining good yields, is possible if the strong bases, such as calcium and sodium hydroxide, are replaced by the merely weakly alkaline sodium sulfite or other alkali and alkaline-earth sulfites. In this way colorless to at most slightly yellow reaction solutions are obtained without the use of decolorizing agents.

The object of the present invention therefore is a method of producing lactulose-concentrate by epimerization of aqueous lactose solutions in a hot weakly alkaline medium, whereupon, if desired, the greater part of the unreacted lactose is recovered from the batch by cooling and inoculation without prior concentration, whereupon the epimerization agent and the organic acids formed are removed by means of an ion exchange substance and after removal of the salt again concentrated and the remaining lactose crystallized out as far as possible. This method is characterized by the fact that hot preferably saturated, approximately 60–65% lactose solutions are treated at temperatures of about 80–110° C., and preferably at the boiling point, with the addition of about 0.05 to 0.5 mol of an alkali or alkaline-earth sulfite per kg. of lactose monohydrate until the optical rotation is constant.

In this way a total of about 70 kg. of lactose hydrate per 100 kg. of lactose hydrate employed can be recovered. The course of the rearrangement can be checked very simply by noting the optical rotations which decreases rapidly at the start and becomes constant towards the end of the reaction. The yield increases with higher addition of sulfite. In practice, however, a compromise must be made between yield and expense for removal of salt. With the preferred addition of 0.1 mol of sodium sulfite per kg. of lactose hydrate, the yield is about 16 kg. of anhydrous lactulose per 100 kg. of lactose hydrate.

Mixtures of sodium sulfite with stronger alkalis, such as alkali and alkaline-earth-hydroxides and -carbonates, can also be used, although this, to be sure, results in a definite increase in the discoloration and the formation of acids. By operating in concentrated solution thereupon, a large part of the unreacted lactose can be crystallized out without prior concentration and used for further reactions. In this connection, no enrichment of colored substances or other reaction products occurs. The lactulose concentrate can, however, also be used directly after the epimerization, possibly after removal of salt, if the presence of the relatively large quantity of lactose and possibly the epimerization agent can be tolerated for the intended purpose of use.

The important new characteristics of and advances represented by the method of the present invention thus reside:

(1) in the use of alkali or alkaline-earth sulfites which was not previously described, and
(2) in the use of highly concentrated lactose solutions, that is, lactose solutions which are saturated in the hot.

In accordance with the known methods (see, for instance, Austrian Pat. No. 198,428), buffer solutions, inter alia, are used, but no sulfites are employed. In this connection it may be pointed out, that sulfites are not buffer substances in the true sense. In particular, however, there is obtained with sulfites an effect, which is not reached with any of the epimerization agents described heretofore—namely, complete lack of color of the reaction products without further use of decoloring agents. The great extent to which colored substances and other by-products complicate the technical course of the production of lactulose can be noted from the cumbersome prior method of working up the reaction batches. Up to now, ethanol was first of all added, the solution, after removal of lactose which had crystallized out, was concentrated, extracted with ether or ethyl acetate, and treated with activated carbon, filtered and the salts removed.

In contradistinction to this, in the method of the present invention, no organic solvent and no decolorizing agent is required, and a colorless product and at least equivalent product is obtained. In order to be able to effect objective comparisons, we worked in accordance with the interesting Examples 1 to 4 of Austrian Pat. No. 198,428, and the color index $\epsilon_{560}$ obtained directly from the epimerization batch after adjusting the pH to 7.0±0.2.

$$\epsilon_{560} = \frac{100 \cdot \epsilon_{560}}{d \cdot r \cdot \rho}$$

$d$ = layer thickness of the measurement cell (cm.)
$r$ = solids content of the solution (percent)
$\rho$ = density (g./ml.)

The following values were obtained:

AUSTRIAN PATENT NO. 198,428

Examples:
1 _____ 0.84
2 _____ 1.16
3 _____ 2.44
4 _____ 0.96
Invention _____ 0.0

In Austrian Pat. No. 198,428 (claim 1) the range of concentrations for the lactose solution used for the epimerization is expressly limited to 5 to 20%. In contradistinction to this, in accordance with the present invention, value is placed on conversion in hot saturated—i.e., about 60–65%—solution, which was heretofore considered unsuitable. The technical advantage resides in the fact, that first of all the reaction vessels can be substantially smaller for the same yield and, second of all, a substantial part of the expense for the concentration and crystallizing of the solution is done away with. This expense is, in addition, further limited by the exclusive use of water as solvent as compared with ethanol and ether or esters.

The following example is intended to serve further to explain the present invention, without, however, the invention being limited to it.

Example.—50 ml. of 0.5 m. sodium sulfite solution are added to a boiling solution of 250 g. of lactose-monohydrate in 135 ml. of water and the entire batch is maintained at the boiling point (102° C.) for 20 minutes. The specific rotation drops during this time from +51 to +32°. Thereupon the batch is cooled to 10 to 20° C. and inoculated with lactose, and after about 12 hours, the lactose which has crystallized out is removed.

The reluctant solution is thereupon completely desalted via ion exchanger and concentrated by vaporizing to 75% and after cooling to 0 to 10° C. and inoculation with lactose, again allowed to crystallize. The lactose which has crystallized out within about 48 hours is again removed. There are obtained 78 g. of a viscous, water-clear syrup which, in 54.5 g. of solids residue, contains 38.7 g. of lactulose, 8.2 g. of galactose, 3.8 g. of lactose and 3.8 g. of a mixture of not further identified sugar. 176.3 g. of lactose monohydrate are recovered and can be used again.

Similar results are obtained when using calcium sulfite or potassium sulfite in place of the exemplified sodium sulfite. Although saturated aqueous lactose solutions were preferred as aforesaid, concentrated solutions which are not saturated may be used with, however, less efficiency.

While we have disclosed several embodiments of the present invention, it is to be understood, that these embodiments are given by example only and not in a limiting sense.

We claim:
1. A method of preparing a lactulose concentrate by epimerization of a hot aqueous lactose solution comprising admixing a hot aqueous concentrated solution of lactose with between about 0.05 and 0.5 mol of at least one sulfite selected from the group consisting of alkali sulfites and alkaline earth sulfites per kg. of lactose monohydrate content of said lactose solution, and maintaining the admixture of said sulfite and said lactose solution at a temperature between about 80° C. and 110° C. to convert lactose in said lactose solution into lactulose.

2. The process, as set forth in claim 1, wherein said concentrated lactose solution is a substantially saturated solution, and wherein said admixture is maintained at the boiling point thereof until the optical rotation characteristic of said solution remains constant.

3. The process, as set forth in claim 2, wherein said sulfite is added in an amount about 0.1 mol per kg. of said lactose monohydrate.

4. The process, as set forth in claim 3, wherein said sulfite is sodium sulfite.

5. The process, as set forth in claim 1, wherein after boiling said admixture, it is cooled, and unreacted lactose is removed by precipitation resulting from said cooling and the inoculation of said solution with seed lactose,
said lactose precipitate is removed,
said sulfite and any organic acids formed are removed utilizing ion exchange for said removal, and
the remaining liquid concentrated, cooled and again inoculated with seed lactose to precipitate lactose in said solution, and
to produce a concentrated aqueous lactulose solution.

6. The process, as set forth in claim 5, wherein said sulfite is sodium sulfite in an amount of about 0.1 mol per kg. of said lactose monohydrate.

7. The process, as set forth in claim 6, wherein said concentrated lactose solution is a substantially saturated solution, and wherein said admixture is maintained at the boiling point thereof until the optical rotation characteristic of said solution remains constant.

References Cited
UNITED STATES PATENTS 3,110,600   11/1963   Bok _____ 260—209 R
3,505,309   4/1970   Carubelli _____ 260—209 R
3,546,206   12/1970   Guth et al. _____ 260—209 R LEWIS GOTTS, Primary Examiner
J. R. BROWN, Assistant Examiner